United States Patent
Xiao

(10) Patent No.: US 9,705,705 B2
(45) Date of Patent: Jul. 11, 2017

(54) METHOD AND APPARATUS FOR ACCESSING SHORTEST PATH BRIDGING NETWORK IN MULTI-HOMING MANNER

(71) Applicant: ZTE CORPORATION, Shenzhen, Guangdong Province (CN)

(72) Inventor: Min Xiao, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 113 days.

(21) Appl. No.: 14/647,425

(22) PCT Filed: Aug. 6, 2013

(86) PCT No.: PCT/CN2013/080906
§ 371 (c)(1),
(2) Date: May 26, 2015

(87) PCT Pub. No.: WO2014/082467
PCT Pub. Date: Jun. 5, 2014

(65) Prior Publication Data
US 2015/0304127 A1     Oct. 22, 2015

(30) Foreign Application Priority Data
Nov. 27, 2012  (CN) .......................... 2012 1 0490992

(51) Int. Cl.
*H04L 12/58*   (2006.01)
*H04L 12/46*   (2006.01)
(Continued)

(52) U.S. Cl.
CPC ........ *H04L 12/4658* (2013.01); *H04L 12/465* (2013.01); *H04L 12/4625* (2013.01);
(Continued)

(58) Field of Classification Search
USPC ......... 370/252, 254, 395.31, 395.52, 395.53, 370/395.54
See application file for complete search history.

(56) References Cited

U.S. PATENT DOCUMENTS

2010/0157844 A1*  6/2010  Casey .................... H04L 45/02
                                                370/254
2012/0033665 A1*  2/2012  Jacob Da Silva .... H04L 45/245
                                                370/389

FOREIGN PATENT DOCUMENTS

CN    101771607 A    7/2010
CN    101800691 A    8/2010
(Continued)

OTHER PUBLICATIONS

Don Fedyk,"Provider Link State Bridging (PLSB)," Nortel Networks,Jan. 2007.*
(Continued)

*Primary Examiner* — Zewdu A Beyen
(74) *Attorney, Agent, or Firm* — Koppel, Patrick, Heybi & Philpott

(57) ABSTRACT

Provided are a method and an apparatus for accessing a shortest path bridging network in a multi-homing manner. The method comprises: receiving an LSP message flooded by an edge node containing an inter-node LAG port in the network, wherein the LSP message carries a B-MAC, a Base VID, and a Portal System Number of the edge node; generating, according to the Base VID and the Portal System Number, a B-VID corresponding to the edge node; and establishing a forwarding table according to the B-MAC and the B-VID; the edge node containing the inter-node LAG port in the network acquiring the B-MAC, the Base VID, and the Portal System Number of the edge node; generating, according to the Base VID and the Portal System Number, the B-VID corresponding to the edge node; and establishing, (Continued)

according to the B-MAC and the B-VID, a mapping table for PBB encapsulation and decapsulation. The disclosure solves the technical problem in the related art that the implementation of the method for accessing a shortest path bridging network in a multi-homing manner is excessively complicated, thereby achieving the technical effect of implementing access to the shortest path bridging network in a multi-homing manner without changing the existing protocol message.

19 Claims, 8 Drawing Sheets

(51) Int. Cl.
- *H04L 12/701* (2013.01)
- *H04L 12/24* (2006.01)
- *H04L 12/709* (2013.01)

(52) U.S. Cl.
CPC ...... *H04L 12/4633* (2013.01); *H04L 12/4641* (2013.01); *H04L 41/0803* (2013.01); *H04L 45/00* (2013.01); *H04L 45/245* (2013.01); *Y02B 60/33* (2013.01)

(56) References Cited

FOREIGN PATENT DOCUMENTS

| | | |
|---|---|---|
| CN | 101827009 A | 9/2010 |
| CN | 101909001 A | 12/2010 |
| CN | 101964746 A | 2/2011 |
| CN | 102224707 A | 10/2011 |

OTHER PUBLICATIONS

International Search Report (Form PCT/ISA/210) for PCT/CN2013/080906 mailed Nov. 7, 2013.

* cited by examiner

| Destination B-MAC (6 bytes) |
|---|
| Source B-MAC (6 bytes) |
| B-TAG (4 bytes, including a 12 bit B-VID) |
| I-TAG (6 bytes, including a 24 bit I-SID) |
| Destination C-MAC (6 bytes) |
| Source C-MAC (6 bytes) |
| Client frame VLAN tag and payload (variable length) |

Fig. 1

| Type (1 byte) | |
|---|---|
| Length (1 byte) | |
| The first ECT-VID tuple | ETC algorithm (4 bytes) |
| | Base VID (12 bits) |
| | U flag (1 bit) |
| | M flag (1 bit) |
| | Reserved field (2 bits) |
| ...... | |
| The nth ECT-VID tuple | ETC algorithm (4 bytes) |
| | Base VID (12 bits) |
| | U flag (1 bit) |
| | M flag (1 bit) |
| | Reserved field (2 bits) |

Fig. 2

| Type (1 byte) | |
|---|---|
| Length (1 byte) | |
| B-MAC (6 bytes) | |
| Reserved field (4 bits) | |
| Base VID (12 bits) | |
| The first I-SID tuple | T flag (1 bit) |
| | R flag (1 bit) |
| | Reserved field (6 bits) |
| | I-SID (24 bits) |
| ...... | |
| The nth I-SID tuple | T flag (1 bit) |
| | R flag (1 bit) |
| | Reserved field (6 bits) |
| | I-SID (24 bits) |

| Type (1 byte) |||
|---|---|---|
| Length (1 byte) |||
| B-MAC (6 bytes) |||
| Reserved field (1 bit) | Inter-node LAG flag (1 bit) | Portal System Number (2 bits) |
| Base VID (12 bits) |||
| The first I-SID tuple | T flag (1 bit) ||
| | R flag (1 bit) ||
| | Reserved field (6 bits) ||
| | I-SID (24 bits) ||
| ...... |||
| The nth I-SID tuple | T flag (1 bit) ||
| | R flag (1 bit) ||
| | Reserved field (6 bits) ||
| | I-SID (24 bits) ||

METHOD AND APPARATUS FOR ACCESSING SHORTEST PATH BRIDGING NETWORK IN MULTI-HOMING MANNER

TECHNICAL FIELD

The disclosure relates to the field of communications, and in particular to a method and an apparatus for accessing a shortest path bridging network in a multi-homing manner.

BACKGROUND

As the application of the Ethernet constantly expands from the local area network to the metropolitan area network and the backbone network, the Ethernet technology also evolves continuously. Institute of Electrical and Electronics Engineers (IEEE), an international organization for standardization, published an 802.1ah Provider Backbone Bridges (PBB) standard and an 802.1aq Shortest Path Bridging (SPB) standard respectively in August, 2008 and June, 2012. The two standards respectively stipulate a data plane and a control plane of the Ethernet which are applied to a network backbone layer.

A PBB data plane adopts PBB encapsulation (also referred to as MAC-in-MAC encapsulation), and the specific encapsulation format is as shown in FIG. 1, wherein Ethernet frames sent by a client (i.e. client frames) are encapsulated therein. The encapsulated client frames carry a Customer MAC Address (C-MAC) and a client frame VLAN tag, wherein the client frame VLAN tag includes 12-bit client frame VLAN Identifiers (VID). When the client frames enter the network, a layer of a new MAC address and a VLAN tag is encapsulated outside the client frames, i.e., a Backbone MAC Address (B-MAC) and a Backbone VLAN tag (B-TAG), wherein the B-MAC includes a 6-byte destination B-MAC and a 6-byte source B-MAC respectively, and the B-TAG includes a 12-bit Backbone VLAN Identifier (B-VID). The PBB standard also stipulates, aside from the B-MAC and the B-TAG, a 6-byte Backbone Service Instance tag (I-TAG) must be encapsulated between the B-TAG and the C-MAC when the PBB encapsulation is performed. The I-TAG includes a 24-bit Backbone Service Instance Identifier (I-SID). The PBB encapsulation is completed at an edge node of the network. After the encapsulation is completed, all nodes including the edge node in the network forward the Ethernet frames according to the destination B-MAC and B-VID, and the I-SID is only taken as the isolation of different service instances at the edge node of the network and does not influence the forwarding of the Ethernet frames. As regards the edge node of the network, one or more client frame VIDs at an ingress port are mapped to one I-SID, one or more I-SIDs are mapped to one B-VID and one or more destination C-MACs are mapped to one destination B-MAC.

An SPB control plane adopts an ISIS-SPB (i.e., an IS-IS applied to an SPB network) link state routing protocol. The protocol performs the corresponding customization and expansion against the Ethernet data plane, on the basis of an Intermediate System to Intermediate System (IS-IS) link state routing protocol stipulated by international standard ISO 10589. As with the IS-IS protocol, the ISIS-SPB protocol likewise includes three protocol messages, which are respectively a Hello message, a Link State PDU (LSP) message and a Sequence Number PDU (SNP) message, wherein the Hello message exchanges between adjacent nodes in the network and is used for the establishment of an adjacency between adjacent network nodes; the LSP message is flooded by any node in the network to all the other nodes; each network node uses link state information of all nodes carried by the LSP message received from all the other nodes to construct a Link State Database (LSDB) of the present node, and then an Ethernet frame forwarding table in the data plane is established according to the LSDB; and the SNP message exchanges between adjacent nodes in the network and is used for the update and synchronization of the LSDB on each network node. As with the IS-IS protocol, each ISIS-SPB protocol message may include multiple protocol message TLVs (Type/Length/Value), and each protocol message TLV may further include multiple protocol message sub-TLVs.

The SPB standard IEEE 802.1aq stipulates a sub-TLV carried by the Hello message, which is named as an SPB Base VLAN-Identifiers sub-TLV, and the specific encapsulation format is as shown in FIG. 2. The sub-TLV includes ECT-VID tuples of which the number is changeable; each ECT-VID tuple includes a 4-byte Equal Cost Tree (ECT) algorithm used for an equal cost path tie-break and a 12-bit Base Virtual Local Area Network identifier (Base VID) used for selecting the ECT algorithm, and a U flag (Use-Flag) for identifying whether the ECT-VID tuple is used by the present node and an M flag (M-Bit) for identifying an SPB working mode (including an SPBM mode using the PBB data plane and an SPBV mode not using the PBB data plane). Since each Base VID can only correspond to one ECT algorithm, the values of the Base VID in various ECT-VID tuples should be different. The SPB standard stipulates that the above-mentioned ECT-VID tuples can also be carried in an SPB Instance sub-TLV in the LSP message aside from being carried in the Hello message, and the values of each pair of ECT algorithm and Base VID that is configured by each node in the network must be completely consistent among all the nodes, otherwise, the adjacency of adjacent nodes and the LSDB of each node cannot be established so that the Ethernet frame forwarding table in the data plane cannot be established.

In order to establish the Ethernet frame forwarding table with the destination B-MAC and B-VID as the input parameters and the egress port as the output parameter in each node. The SPB standard also stipulates a sub-TLV carried by the LSP message, which is named as an SPBM Service Identifier and Unicast Address sub-TLV, and the specific encapsulation format is as shown in FIG. 3. The sub-TLV includes a 6-byte the present node B-MAC, a 4-bit reserved field, a 12-bit Base VID and I-SID tuples of which the number is changeable, wherein each I-SID tuple includes a 24-bit I-SID, a T flag for identifying whether a service flow corresponding to the I-SID is sent by the present node and an R flag for identifying whether the service flow corresponding to the I-SID is received by the present node. The above-mentioned sub-TLV can only be carried in the LSP message flooded outwards by the network edge node, and can appear many times in the same LSP message, but the B-MAC included in the appearing sub-TLV should be different each time. The SPB standard stipulates that the 12-bit Base VIDs carried in the above-mentioned sub-TLV also correspond to the B-VIDs used for differentiating different B-VLANs on a one-to-one basis, aside from being used for selecting different ECT algorithms. All the network nodes receiving the above-mentioned sub-TLV extract the B-MAC and Base VID carried therein, which are respectively regarded as input parameters, destination B-MAC and B-VID, of the established forwarding table, and then network topology information is acquired according to the LSDB, and a shortest path first algorithm and an equal cost path tie-break ECT algorithm are used to calculate the egress port of an output parameter. The SPB standard also stipulates that a many-to-one mapping relationship between the client frame VIDs and the I-SID and a many-to-one mapping relationship between the I-SIDs and the Base VID must be configured at the network edge node working in the SPBM mode, which are at various ingress ports, and a mapping relationship between the C-MAC and the B-MAC must be learnt from the PBB Ethernet frames received from other edge nodes. The above-mentioned various mapping relationships are all used for completing PBB encapsulation and decapsulation at the network edge node.

The IEEE 802.1AX-2008 standard defines the single node Link Aggregation technology that is to logically bind multiple physical links which connect one node and its the same one adjacent node so as to be used as one logical link, i.e., a Link Aggregation Group (LAG), achieving the load sharing of the service flow among these multiple physical member links constituting the LAG Under the condition where some of the member links have a fault, the service flow is fast switched to other fault-free member links, thereby achieving the redundancy protection function. Currently, the IEEE 802.1AX-REV project is revising and expanding the single node link aggregation technology defined by the 802.1AX-2008 standard, and aims to formulate an inter-node link aggregation working mechanism that can logically bind multiple physical links which connect one or more (two or three) nodes and multiple (two or three) different adjacent nodes so as to be used as one logical link. The purpose thereof is consistent with the single node link aggregation technology about achieving the load sharing and redundancy protection of the service flow among the LAG member links. The 802.1AX-REV draft standard (version D0.4 published in October, 2012) stipulates that, when achieving the inter-node link aggregation technology, as shown in FIG. 4, one or more nodes at a side of an inter-node LAG constitute a portal together, each node constituting the portal has an unique Portal System Number, and the value range of the number is an integer from 1 to 3. If multiple nodes constitute one portal, there must be a physical link named as Intra-Portal Link (IPL) among the multiple nodes, which is regarded as a channel of exchanging information required by multiple nodes in a portal for completing the link aggregation.

In order to solve the problem encountered when a single customer device uses the inter-node link aggregation technology to access a Provider Link State Bridging (PLSB) network via multiple network edge nodes, which is also named as accessing in a multi-homing manner, an issued U.S. Pat. No. 8,270,290 (Resilient Attachment to Provider Link State Bridging (PLSB) Networks) proposes a solution. The PLSB network mentioned in the patent is the predecessor (another appellation) of the SPBM network stipulated by the above-mentioned standardized 802.1aq, and adopts a PBB data plane and an IS-IS control plane. The patent mainly solves two problems. As shown in FIG. 5, the first problem is described as follows. Client flows from a customer device respectively enter into an edge node 1 and an edge node 2 via load sharing, and the edge node 1 and the edge node 2 perform the PBB encapsulation respectively on the client flows entering the PLSB network. The flows after the encapsulation from the edge node 1 and the edge node 2 may be received alternately at a far-end edge node (e.g. an edge node 4). If the edge node 1 and the edge node 2 adopt different B-MACs to perform the PBB encapsulation, when a mapping relationship between the B-MAC and the C-MAC is learnt at the far-end edge node according to the received flows, repetitive flip-flop of mapping the same C-MAC to different B-MACs may appear, and this needs to be avoided. As regards the first problem, the patent proposes the solution that customer ports which are distributed on different edge nodes and belong to the same LAG are configured with the same B-MAC, and meanwhile, a pseudo node is simulated on an IPL connected to different edge nodes; a real edge node represents the pseudo node to flood the LSP message carrying pseudo node link state information to other nodes in the PLSB network, and the real edge node pretends to be a neighbour node of the pseudo node so as to flood outwards the LSP message carrying the link state information of the present node; and other nodes in the network establish the LSDB via multiple received LSP messages and calculate the Ethernet frame forwarding table directing to the pseudo node. The second problem is described as follows: the flows from the far-end edge node (e.g. the edge node 4) to the customer device may be sent either to the edge node 1 or to the edge node 2, which can only passively select a forwarding path with a low cost according to the shortest path first algorithm adopted by the IS-IS protocol, and lacks an active and controllable method for selecting a destination node between the edge node 1 and the edge node 2. As regards the second problem, the patent proposes the solution that the customer ports which are distributed on different edge nodes and belong to the same LAG are configured with respectively different B-VIDs, and each edge node floods out the same B-MAC and the respectively different B-VIDs together. In this way, Ethernet frame forwarding table entries going towards the edge node 1 and the edge node 2 are respectively established on the other nodes in the network according to different B-VIDs.

Aiming for the above-mentioned two problems, although the issued US patent U.S. Pat. No. 8,270,290 proposes the corresponding solutions, the two solutions both have defects. The defects of the solution of the first problem mainly lie in: firstly, it is complicated to be implemented, because the method requires the real edge node to simulate the pseudo node to flood the LSP message outwards; secondly, the introduction of the pseudo node LSP will increase the flow burden of the LSP messages in the network and the burden of each node to process the LSP messages, especially for a network which has a lot of customer devices which accesses via the inter-node link aggregation technology. The defects of the solution of the second problem mainly lie in: firstly, the manual configuration is more cumbersome and is error-prone, because the solution requires each edge node located in the same inter-node LAG to be configured with a completely different B-VID; secondly, it has poor compatibility with the published SPB standard IEEE 802.1aq, because the SPB standard stipulates that the Base VID notified by each edge node flooding outwards can be used to select the ECT algorithm and can also be used to present the B-VID, and requires the Base VIDs notified outwards by all the nodes in the network are completely consistent, but the solution requires each edge node located in the same inter-node LAG to notify outwards the completely different B-VID respectively.

No effective solution has been presented for the above-mentioned defects.

SUMMARY

The embodiments of the disclosure provide a method and an apparatus for accessing a shortest path bridging network in a multi-homing manner, so as to at least solve the technical problem in the related art that the implementation of the method for accessing a shortest path bridging network in multi-homing manner is excessively complicated.

According to one example of the embodiments of the disclosure, a method for accessing a shortest path bridging network in a multi-homing manner is provided, which includes: receiving an LSP message flooded by an edge node containing an inter-node LAG port in a network, wherein the above-mentioned LSP message carries a B-MAC, a Base VID, and a Portal System Number of the above-mentioned edge node; generating, according to the above-mentioned Base VID and the above-mentioned Portal System Number, a B-VID corresponding to the above-mentioned edge node; and establishing a forwarding table according to the above-mentioned B-MAC and the above-mentioned B-VID.

Generating, according to the above-mentioned Base VID and the above-mentioned Portal System Number, the B-VID corresponding to the above-mentioned edge node includes: under the condition where received multiple LSP messages flooded by multiple edge nodes carry the same B-MAC, determining whether the above-mentioned each of the LSP messages carries an inter-node LAG flag bit, wherein the above-mentioned inter-node LAG flag bit is used to indicate that an edge node flooding the LSP messages contains an inter-node LAG port corresponding to the above-mentioned B-MAC; and if each of the LSP messages carries the inter-node LAG flag bit, generating, according to the above-mentioned Base VID and the above-mentioned Portal System Number, the B-VID corresponding to the above-mentioned edge node.

Under the condition where the above-mentioned LSP message is an ISIS-SPB LSP message, two bits in a reserved field of a sub-TLV of the above-mentioned ISIS-SPB LSP message carry the above-mentioned Portal System Number, and one bit in the reserved field in the sub-TLV of the above-mentioned ISIS-SPB LSP message carries the above-mentioned inter-node LAG flag bit.

Different edge nodes located in the same inter-node LAG correspond to different Portal System Numbers.

A value of the above-mentioned Portal System Number includes one of the following: 1, 2, or 3.

Generating, according to the above-mentioned Base VID and the above-mentioned Portal System Number, a B-VID corresponding to the above-mentioned edge node includes: obtaining a B-VID corresponding to the above-mentioned edge node by adding the above-mentioned Portal System Number to the above-mentioned Base VID and then subtracting 1.

Establishing the forwarding table according to the above-mentioned B-MAC and the above-mentioned B-VID includes: determining a shortest path tie-break ECT algorithm corresponding to the Base VID used for calculating the above-mentioned B-VID, wherein the corresponding relationships between the Base VIDs and the shortest path tie-break ECT algorithms configured by all nodes in the network are the same; and establishing the forwarding table according to the above-mentioned B-MAC, the above-mentioned B-VID, and the above-mentioned determined shortest path tie-break ECT algorithm.

According to another example of the embodiments of the disclosure, another method for accessing a shortest path bridging network in a multi-homing manner is provided, which includes: an edge node containing an inter-node LAG port in the network acquiring a B-MAC, a Base VID, and a Portal System Number of the edge node; generating, according to the above-mentioned Base VID and the above-mentioned Portal System Number, a B-VID corresponding to the above-mentioned edge node; and establishing, according to the above-mentioned B-MAC and the above-mentioned B-VID, a mapping table for PBB encapsulation and decapsulation.

Different edge nodes located in the same inter-node LAG correspond to different Portal System Numbers.

A value of the above-mentioned Portal System Number includes one of the following: 1, 2, or 3.

Generating, according to the above-mentioned Base VID and the above-mentioned Portal System Number, a B-VID corresponding to the above-mentioned edge node includes: obtaining a B-VID corresponding to the above-mentioned edge node by adding the above-mentioned Portal System Number to the above-mentioned Base VID and then subtracting 1.

Establishing the mapping table for the PBB encapsulation and decapsulation according to the above-mentioned B-MAC and the above-mentioned B-VID includes: according to a mapping relationship between the Base VID used for generating the above-mentioned B-VID and one or more service instances, establishing a mapping relationship between the B-VID and the above-mentioned one or more service instances.

According to a further example of the embodiments of the disclosure, an apparatus for accessing a shortest path bridging network in a multi-homing manner is provided, which includes: a receiving unit, configured to receive an LSP message flooded by an edge node containing an inter-node LAG port in the network, wherein the above-mentioned LSP message carries a B-MAC, a Base VID, and a Portal System Number of the above-mentioned edge node; a generation unit, configured to generate, according to the above-mentioned Base VID and the above-mentioned Portal System Number, a B-VID corresponding to the above-mentioned edge node; and an establishment unit, configured to establish a forwarding table according to the above-mentioned B-MAC and the above-mentioned B-VID.

The above-mentioned generation unit includes: a first determination component, configured to, under the condition where received multiple LSP messages flooded by multiple edge nodes carry the same B-MAC, determine whether the above-mentioned each of the LSP messages carries an inter-node LAG flag bit, wherein the above-mentioned inter-node LAG flag bit is used to indicate that an edge node flooding the LSP messages contains an inter-node LAG port corresponding to the above-mentioned B-MAC; and a generation component, configured to, under the condition of determining that each of the LSP messages carries the inter-node LAG flag bit, generate, according to the above-mentioned Base VID and the above-mentioned Portal System Number, the B-VID corresponding to the above-mentioned edge node.

The above-mentioned generation unit is further configured to obtain a B-VID corresponding to the above-mentioned edge node by adding the above-mentioned Portal System Number to the above-mentioned Base VID and then subtracting 1.

The above-mentioned establishment unit includes: a second determination component, configured to determine a shortest path tie-break ECT algorithm corresponding to the Base VID used for calculating the above-mentioned B-VID, wherein the corresponding relationships between the Base VIDs and the shortest path tie-break ECT algorithms configured by all nodes in the network are the same; and an establishment component, configured to establish the forwarding table according to the above-mentioned B-MAC, the above-mentioned B-VID, and the above-mentioned determined shortest path tie-break ECT algorithm.

According to a further example of the embodiments of the disclosure, another apparatus for accessing a shortest path bridging network in a multi-homing manner is provided and is located in an edge node containing an inter-node LAG port, including: an acquisition unit, configured to acquire a B-MAC, a Base VID, and a Portal System Number of the edge node; a generation unit, configured to generate, according to the above-mentioned Base VID and the above-mentioned Portal System Number, a B-VID corresponding to the above-mentioned edge node; and an establishment unit, configured to establish, according to the above-mentioned B-MAC and the above-mentioned B-VID, a mapping table for PBB encapsulation and decapsulation.

In an example embodiment, the above-mentioned generation unit is further configured to obtain a B-VID corresponding to the above-mentioned edge node by adding the above-mentioned Portal System Number to the above-mentioned Base VID and then subtracting 1.

In an example embodiment, the above-mentioned establishment unit is further configured to, according to a mapping relationship between the Base VID used for generating the above-mentioned B-VID and one or more service instances, establish a mapping relationship between the B-VID and the above-mentioned one or more service instances.

In the embodiments of the disclosure, in order to achieve accessing a shortest path bridging network in a multi-homing manner, an LSP message flooded by a network edge node containing an inter-node LAG port carries a B-MAC, a Base VID corresponding to the B-MAC and a Portal System Number of the network edge node, so that other network nodes can acquire the corresponding Base VID and the Portal System Number of the edge node from the received LSP message flooded, and can determine a B-VID according to the acquired Base VID and the Portal System Number of the edge node, finally establishing a forwarding table. The network edge node containing the inter-node LAG port acquires the Base VID and the Portal System Number thereof, and determines the B-VID according to the acquired Base VID and the Portal System Number, finally establishing a mapping table for PBB encapsulation and decapsulation. The above-mentioned approaches are used to solve the technical problem in the prior art that the implementation of the method for accessing a shortest path bridging network in a multi-homing manner is excessively complicated, and achieve the technical effect of implementing access to the shortest path bridging network in a multi-homing manner without changing the existing protocol message, and the implementation is relatively simple.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings:

FIG. 1 is an encapsulation format diagram of a PBB data plane according to the related art;

FIG. 2 is an encapsulation format diagram of an SPB base virtual local area network identifier sub-TLV stipulated by the IEEE 802.1aq standard according to the related art;

DETAILED DESCRIPTION OF THE EMBODIMENTS

The disclosure is described below with reference to the accompanying drawings and embodiments in detail. Note that, the embodiments of the present application and the features of the embodiments can be combined with each other if there is no conflict.

Figures 3, 4:
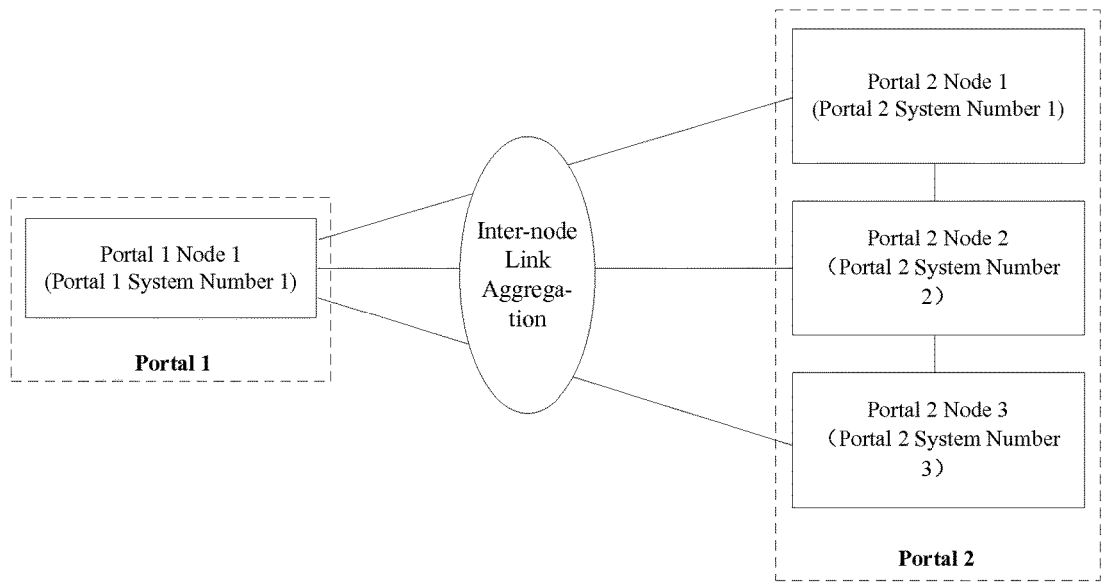
FIG. 3 is an encapsulation format diagram of an SPBM service identifier and unicast address sub-TLV stipulated by the IEEE 802.1aq standard according to the related art.
FIG. 4 is a schematic diagram of an inter-node link aggregation technology stipulated by the IEEE 802.1AX-REV draft standard according to the related art.
Figure 5:
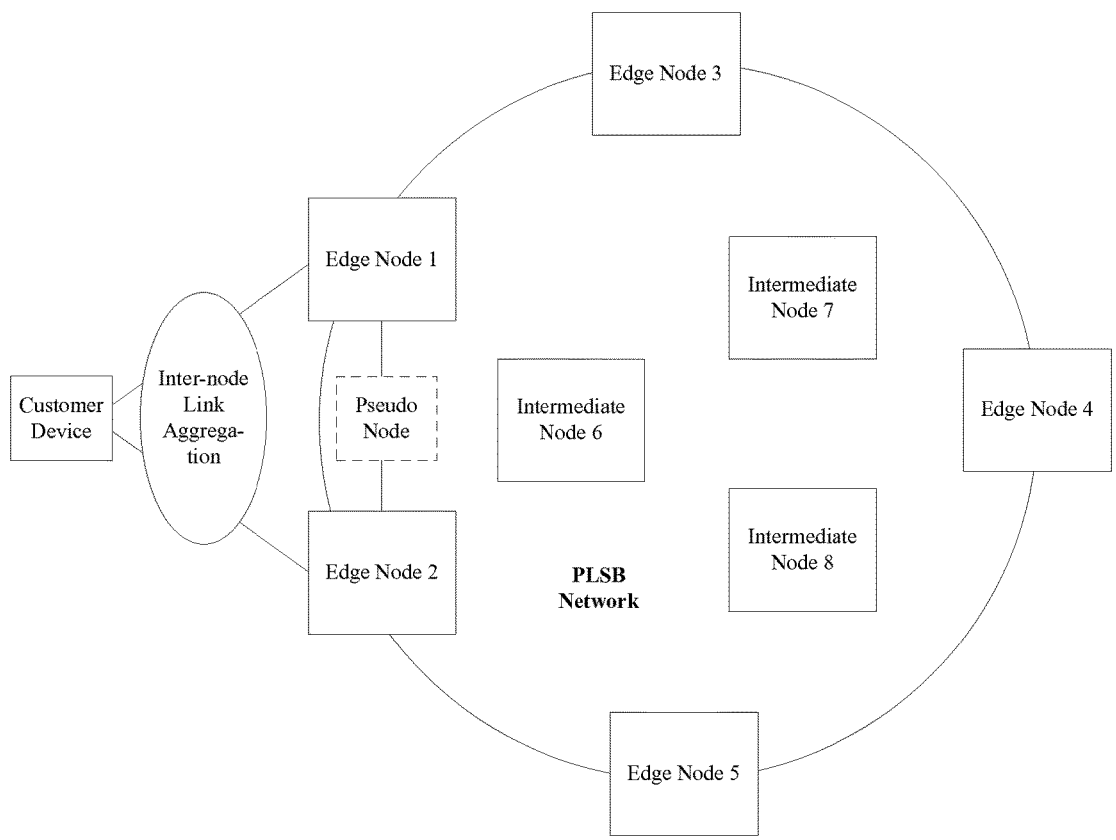
FIG. 5 is a schematic diagram of a network scene applied to an issued US patent U.S. Pat. No. 8,270,290 according to the related art.
Figure 6:
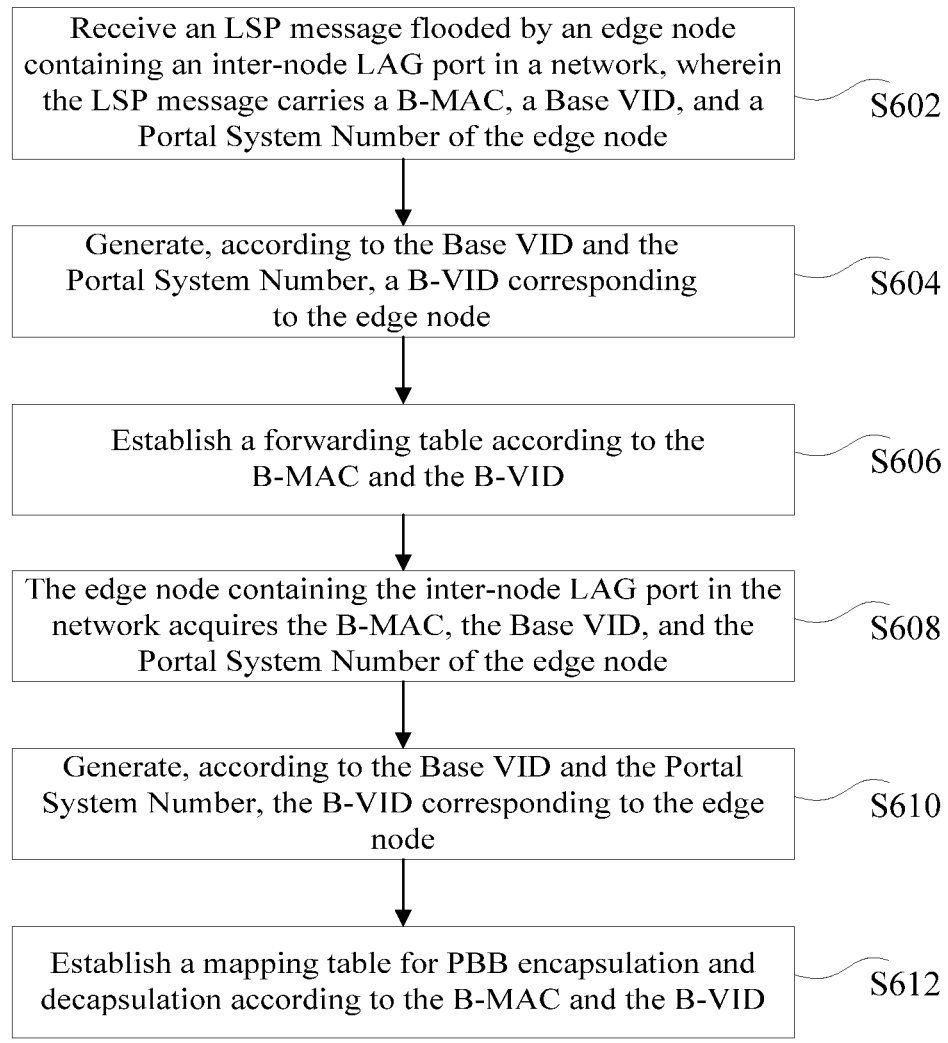
FIG. 6 is a flowchart of a method for accessing a shortest path bridging network in a multi-homing manner according to an embodiment of the disclosure.

The embodiments of the disclosure provide a method for accessing a shortest path bridging network in a multi-homing manner. As shown in FIG. 6, the method includes the following steps:

step S602: receive an LSP message flooded by an edge node containing an inter-node LAG port in a network, wherein the LSP message carries a B-MAC, a Base VID, and a Portal System Number of the edge node;

step S604: generate, according to the Base VID and the Portal System Number, a B-VID corresponding to the edge node;

step S606: establish a forwarding table according to the B-MAC and the B-VID;

step S608: the edge node containing the inter-node LAG port in the network acquires the B-MAC, the Base VID, and the Portal System Number of the edge node;

step S610: generate, according to the Base VID and the Portal System Number, the B-VID corresponding to the edge node; and step S612: establish a mapping table for PBB encapsulation and decapsulation according to the B-MAC and the B-VID.

Figures 7, 8:
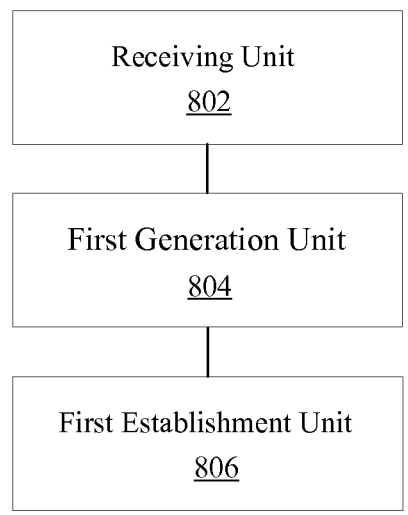
FIG. 7 is an encapsulation format diagram of an SPBM service identifier and unicast address sub-TLV according to an embodiment of the disclosure.
FIG. 8 is a structure diagram of an apparatus contained by all nodes in the network according to an embodiment of the disclosure.

In an example embodiment, in step S602, a network edge node containing an inter-node LAG port floods outwards to notify the B-MAC corresponding to the LAG, an inter-node LAG flag bit indicating that the B-MAC is applied to the inter-node LAG, the Base VID for selecting a shortest path tie-break ECT algorithm, and the Portal System Number of the present network edge node corresponding to the LAG In an example embodiment, in order not to change the existing protocol type and the existing LSP message, a reserved field of an ISIS-SPB LSP message may carry the above-mentioned inter-node LAG flag bit and Portal System Number. As mentioned in the background of the present application, the published SPB standard stipulates the ISIS-SPB protocol and an LSP message adopted by this protocol, and the LSP message carries a sub-TLV which is named as an SPBM service identifier and unicast address sub-TLV. There is 4-bit reserved field between a B-MAC field and a Base VID field of the sub-TLV, the 4-bit reserved field may be used to carry the above-mentioned inter-node LAG flag bit and Portal System Number, and the specific encapsulation format is as shown in FIG. 7. One bit of the 4 bits is taken as the inter-node LAG flag, used for identifying whether the B-MAC carried in the sub-TLV is applied to the inter-node LAG, 2 bits thereof are taken as the Portal System Number, used for identifying the Portal System Number of the present node in the inter-node LAG corresponding to the B-MAC carried in the sub-TLV (In an example embodiment, the value range of the Portal System Number is from 1 to 3), and in the same inter-node LAG, the Portal System Number of each edge node should be different.

In an example embodiment, before step S604, under the condition where received multiple LSP messages flooded by multiple edge nodes carry the same B-MAC, a network node determines whether each of the LSP messages carries an inter-node LAG flag bit, wherein the inter-node LAG flag bit is used to indicate that the edge node flooding the LSP messages contains an inter-node LAG port corresponding to the B-MAC; if each of the LSP messages carries the inter-node LAG flag bit, according to the Base VID and the Portal System Number, the B-VID corresponding to the edge node is generated; and if any of the LSP messages does not carry the inter-node LAG flag bit, the network node receiving multiple LSP messages carrying the same B-MAC may consider that the network configuration has an error, and the correct forwarding table cannot be established.

In an example embodiment, in step S604, the network node extracts the B-MAC, the Base VID and the Portal System Number from the received LSP message flooded by the network edge node containing the inter-node LAG port, different B-VIDs corresponding to different network edge nodes and used for establishing the forwarding table are obtained via calculation by adding the Portal System Number to the Base VID and then subtracting 1, which are respectively regarded as input parameters, destination B-MAC and B-VID, of the established forwarding table, and then network topology information is acquired according to an LSDB, and a shortest path first algorithm and an equal cost path tie-break ECT algorithm are used to calculate an output parameter, an egress port. The reason for calculating the B-VID by adding the Portal System Number to the Base VID and then subtracting 1 here is to enable the minimum one of calculated multiple (two or three) B-VIDs for establishing the forwarding table to be the same as the Base VID, so as to ensure that the B-VID corresponding to the local-end edge node with the minimum Portal System Number of the same inter-node LAG is consistent with the B-VID (i.e. the Base VID) corresponding to the far-end edge node accessing network in a single-homing manner.

In an example embodiment, in step S606, in consideration that the related art requires configuring consistent Base VID and ECT algorithm in the whole network, i.e., the corresponding relationships between the Base VIDs and the shortest path tie-break ECT algorithms configured by all nodes in the network are the same, and the implementation manner of the present embodiment is to determine the B-VID via the Base VID, in order to achieve the correspondence, it needs to determine a corresponding relationship between the B-VID and the ECT algorithm according to a corresponding relationship between the Base VID for calculating the B-VID and the ECT algorithm, and then the forwarding table is established according to the B-MAC, the B-VID and the determined shortest path tie-break ECT algorithm.

In an example embodiment, in step S610, the network edge node containing the inter-node LAG port adds the Portal System Number of the present node corresponding to the LAG to the Base VID and then subtracts 1, so as to obtain the B-VID applied for the PBB encapsulation and decapsulation of the LAG port. As regards the network edge node which does not contain the inter-node LAG port, the configured Base VID can be directly taken as the B-VID used for the PBB encapsulation and decapsulation. As regards the network edge node containing the inter-node LAG port, in order to achieve the purpose of using different B-VIDs to realize forwarding isolation, it needs to calculate different B-VIDs with regard to different network edge nodes containing the same inter-node LAG logical port, which are applied by different network edge nodes for the PBB encapsulation and decapsulation of the same LAG logical port. The reason for calculating the B-VID by adding the Portal System Number of the present node to the Base VID and then subtracting 1 here is to enable the calculated B-VID for the local-end edge node with the minimum Portal System Number of the same inter-node LAG to be the same as the Base VID, so as to ensure that the B-VID, used for the PBB encapsulation and decapsulation, of the local-end edge node is consistent with the B-VID (i.e. the Base VID), used for the PBB encapsulation and decapsulation, of the far-end edge node accessing network in a single-homing manner.

In an example embodiment, in step S612, in consideration that the related art requires to configure a mapping relationship between the Base VID and one or more service instances at a network edge node, and the implementation manner of the present embodiment is to determine the B-VID via the Base VID, in order to achieve the correspondence, it needs to establish, according to the mapping relationship between the Base VID used for generating the B-VID and the one or more service instances, a mapping relationship between the B-VID and the one or more service instances.

The embodiments of the disclosure also provide an apparatus for accessing a shortest path bridging network in a multi-homing manner, which is located in each network node of the network, and the apparatus is used to achieve the above-mentioned embodiments and example embodiments, thereby needing no further description for the embodiments that have been described. As used below, the term "unit" or "component" is a combination of software and/or hardware that may achieve a predefined function. Although the apparatus described in the following embodiments is achieved better by using software, hardware or a combination of software and hardware is achievable and is conceived.

FIG. 8 is a structure diagram of an apparatus contained by all nodes in the network according to an embodiment of the disclosure. As shown in FIG. 8, the apparatus includes a receiving unit 802, a first generation unit 804 and a first establishment unit 806, and the structure is described below.

The receiving unit 802 is configured to receive an LSP message flooded by an edge node containing an inter-node LAG port in the network, wherein the LSP message carries a B-MAC, a Base VID, and a Portal System Number of the edge node.

The first generation unit 804 is coupled to the receiving unit 802 and is configured to generate, according to the Base VID and the Portal System Number, a B-VID corresponding to the edge node.

The first establishment unit 806 is coupled to the generation unit 804 and is configured to establish a forwarding table according to the B-MAC and the B-VID.

Figure 9:
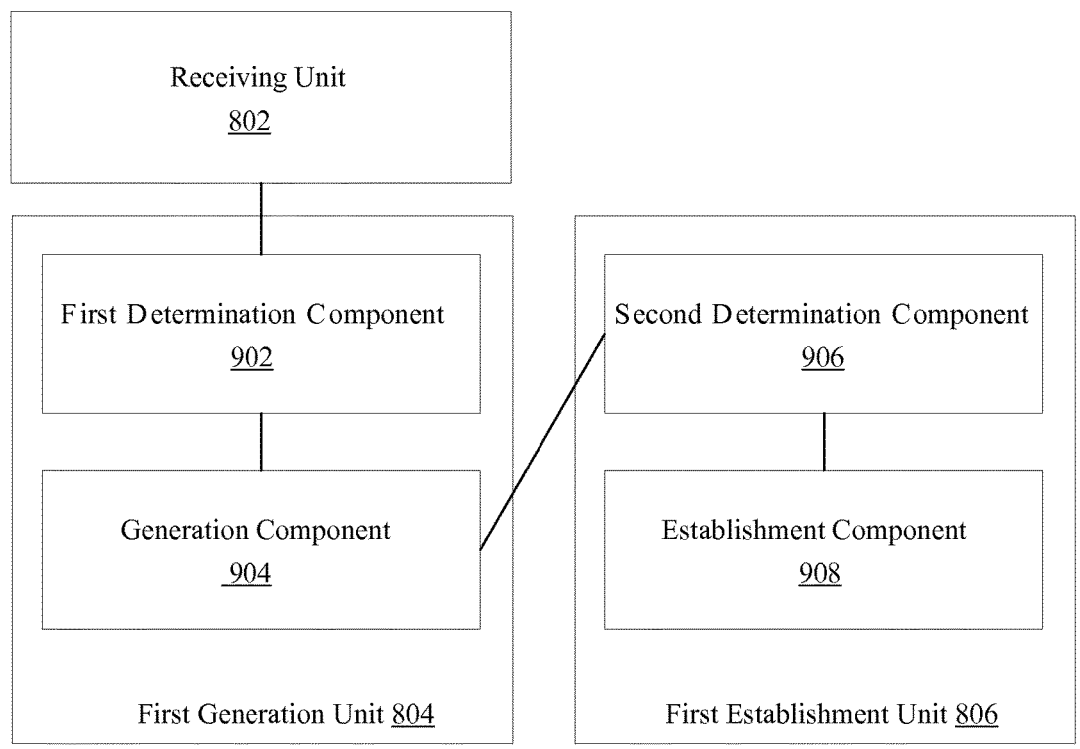
FIG. 9 is an example structure diagram of an apparatus contained by all nodes in the network according to an embodiment of the disclosure.

In an example embodiment, in the present embodiment, as shown in FIG. 9, the first generation unit 804 may include: a first determination component 902, configured to, under the condition where received multiple LSP messages flooded by multiple edge nodes carry the same B-MAC, determine whether each of the LSP messages carries an inter-node LAG flag bit, wherein the inter-node LAG flag bit is used to indicate that an edge node flooding the LSP messages contains an inter-node LAG port corresponding to the B-MAC; and a generation component 904, coupled to the first determination component 902 and configured to, under the condition of determining that each of the LSP messages carries the inter-node LAG flag bit, generate, according to the Base VID and the Portal System Number, the B-VID corresponding to the edge node. The first establishment unit 806 may include: a second determination component 906, coupled to the first generation unit 804 and configured to determine a shortest path tie-break ECT algorithm corresponding to the Base VID used for calculating the B-VID, wherein the corresponding relationships between the Base VIDs and the shortest path tie-break ECT algorithms configured by all nodes in the network are the same; and an establishment component 908, coupled to the second determination component 906 and configured to establish a forwarding table according to the B-MAC, the B-VID, and the determined shortest path tie-break ECT algorithm.

In an example embodiment, the above-mentioned first generation unit 804 may obtain a B-VID corresponding to the edge node which is calculated by adding the Portal System Number to the Base VID and then subtracting 1.

Figure 10:
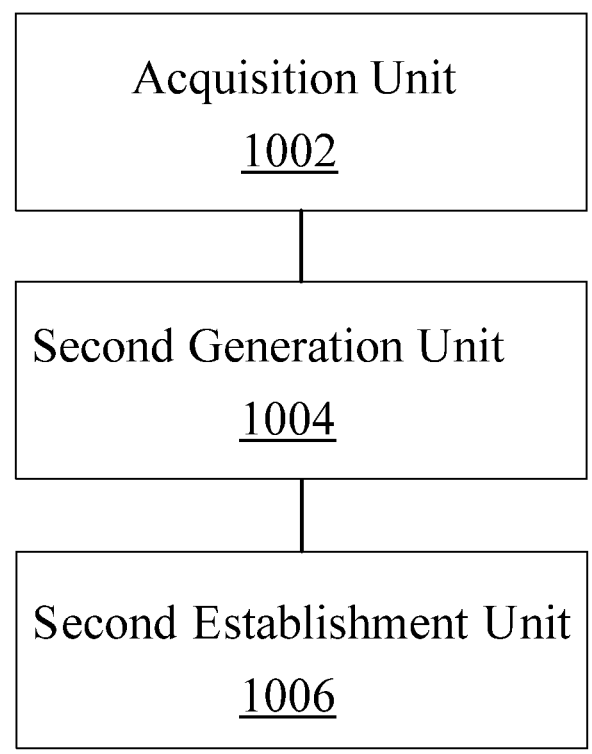
FIG. 10 is a structure diagram of an apparatus contained by an edge node containing an inter-node LAG port in the network according to an embodiment of the disclosure.

FIG. 10 is a structure diagram of an apparatus contained by an edge node containing an inter-node LAG port in the network according to an embodiment of the disclosure. As shown in FIG. 10, aside from the units and components shown in FIGS. 8 and 9, the edge node containing the inter-node LAG port further includes an acquisition unit 1002, a second generation unit 1004 and a second establishment unit 1006, and the structure is described below.

The acquisition unit 1002 is configured to acquire the B-MAC, the Base VID, and the Portal System Number of the edge node.

The second generation unit 1004 is coupled to the acquisition unit 1002 and configured to generate, according to the Base VID and the Portal System Number, a B-VID corresponding to the edge node.

The second establishment unit 1006 is coupled to the second generation unit 1004 and configured to establish a mapping table for PBB encapsulation and decapsulation according to the B-MAC and the B-VID.

In an example embodiment, the above-mentioned second generation unit 1004 may obtain a B-VID corresponding to the edge node which is calculated by adding the Portal System Number to the Base VID and then subtracting 1. The second establishment unit 1006 may establish, according to a mapping relationship between the Base VID used for generating the B-VID and one or more service instances, a mapping relationship between the B-VID and the one or more service instances.

In short, the embodiments of the disclosure provide a method and an apparatus for accessing a shortest path bridging network in a multi-homing manner under the condition of not adding the protocol message and manual configuration burden in the network. When a customer device accesses an SPBM network in a multi-homing manner, by expanding information carried in an LSP message of an ISIS-SPB protocol defined by the SPB standard IEEE 802.1aq, and stipulating the encapsulation way of a network edge node containing an inter-node LAG port and the way of a network node processing the newly added information carried by the received LSP message, a solution that does not add the protocol message and manual configuration burden in the network, is easy to achieve and has compatibility with the existing industrial standard is mainly provided.

The disclosure is further described below in conjunction with two example embodiments.

Example Embodiment 1

In the present example embodiment, a local-end customer device 1 uses the inter-node link aggregation technology to access an SPBM network in a dual-homing manner via a network edge node 1 and a network edge node 2. A far-end customer device 2 uses the inter-node link aggregation technology to access the SPBM network in a dual-homing manner via a network edge node 3 and a network edge node 4. It is assumed that all nodes in the network are configured with the same one pair of Base VID and ECT algorithm, wherein the value of the Base VID is 10 and the value of the ECT algorithm is 1.

Figure 11:
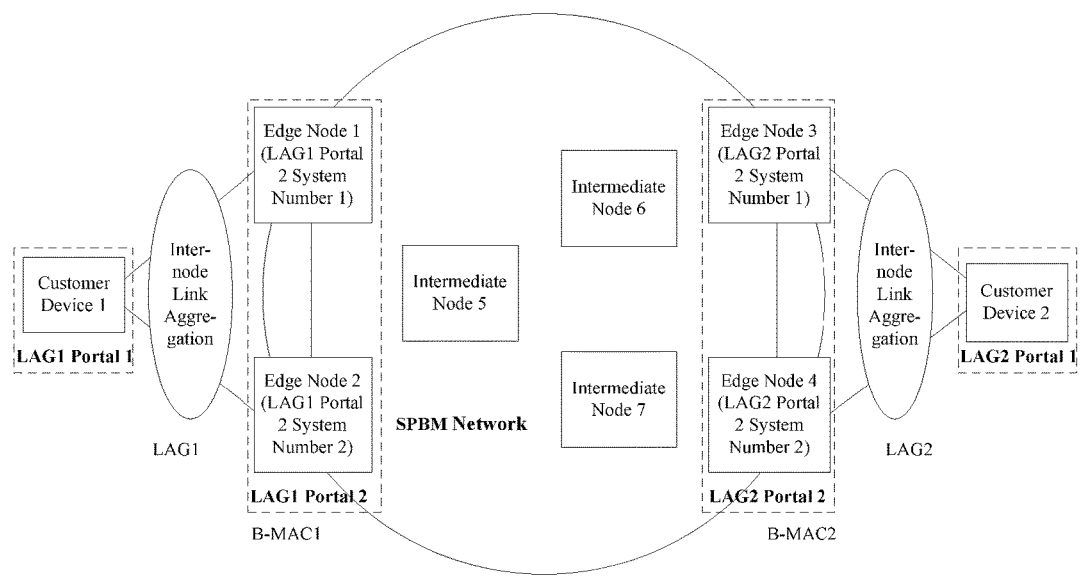
FIG. 11 is a schematic diagram of a network scene of local-end dual-homing and far-end dual-homing of the example embodiment 1 according to an embodiment of the disclosure.

As shown in FIG. 11, it is a schematic diagram of a network scene of local-end dual-homing and far-end dual-homing of the present example embodiment 1, and the notifying and processing procedure of each network node of the present example embodiment may include the following steps:

Step S1: network edge nodes 1 and 2 containing an inter-node LAG (LAG1) port respectively notify outwards a B-MAC1 corresponding to the LAG1, and meanwhile, respectively notify a flag bit for indicating that the B-MAC1 is applied to the inter-node LAG. In an example embodiment, the flag bit may be set as 1 to identify that the B-MAC1 is applied to the inter-node LAG Similarly, network edge nodes 3 and 4 containing an inter-node LAG (LAG2) port respectively notify outwards a B-MAC2 corresponding to the LAG2, and meanwhile, respectively notify a flag bit for indicating that the B-MAC2 is applied to the inter-node LAG, i.e., setting the flag bit as 1. The network edge nodes 1 and 2 containing the inter-node LAG (LAG1) port respectively notify outwards a Base VID 10 and a corresponding ECT algorithm 1, and meanwhile, respectively notify Portal System Numbers 1 (in an example embodiment, it is presented by using a binary number 01) and 2 (a binary number 10) of the present node corresponding to the LAG1. Similarly, the network edge nodes 3 and 4 containing the inter-node LAG (LAG2) port respectively notify outwards a Base VID 10 and a corresponding ECT algorithm 1, and meanwhile, respectively notify Portal System Numbers 1 (a binary number 01) and 2 (a binary number 10) of the present node corresponding to the LAG2.

Network intermediate nodes 5, 6 and 7 may also respectively flood an LSP message outwards and notify a Base VID 10 and a corresponding ECT algorithm 1. Since there is no need to configure a B-MAC on the network intermediate nodes, none of the LSP messages flooded outwards includes the B-MAC.

Step S2: all the other nodes in the network apart from the edge nodes 1 and 2 may receive the B-MAC1s notified by the two edge nodes respectively, and the flag bit is used to judge that the B-MAC1 is applied to the inter-node LAG. Similarly, all the other nodes in the network apart from the edge nodes 3 and 4 may receive the B-MAC2s notified by the two edge nodes respectively, and the flag bit is used to judge that the B-MAC2 is applied to the inter-node LAG. The network nodes 3, 4, 5, 6 and 7 receive the Base VID 10 and the Portal System Numbers 1 and 2 which are notified by the network edge nodes 1 and 2 respectively, a B-VID 10 and a B-VID 11 respectively corresponding to the network edge nodes 1 and 2 are obtained via calculation by adding the Portal System Number to the Base VID and then subtracting 1, and the obtained B-VID 10 and B-VID 11 both use the ECT algorithm 1 selected by the Base VID 10. Similarly, the network nodes 1, 2, 5, 6 and 7 receive the Base VID 10 and the Portal System Numbers 1 and 2 which are notified by the network edge nodes 3 and 4 respectively. A B-VID 10 and a B-VID 11 respectively corresponding to the network edge nodes 3 and 4 are obtained via calculation by adding the Portal System Number to the Base VID and then subtracting 1, and the obtained B-VID 10 and B-VID 11 both use the ECT algorithm 1 selected by the Base VID 10.

The network nodes 3, 4, 5, 6 and 7 extract the B-MAC1, the Base VID 10 and the Portal System Numbers 1 (the binary number 01) and 2 (the binary number 10) respectively from the received LSP messages flooded by the network edge nodes 1 and 2, and then the B-MAC1 and the calculated B-VIDs 10 and 11 are respectively taken as input parameters, destination B-MAC and B-VID, of an established forwarding table, and then network topology information is acquired according to an LSDB, and a shortest path first algorithm and the ECT algorithm 1 are used to calculate egress ports respectively going towards the network edge nodes 1 and 2. Similarly, the network nodes 1, 2, 5, 6 and 7 extract the B-MAC2, the Base VID 10 and the Portal System Numbers 1 (the binary number 01) and 2 (the binary number 10) respectively from the received LSP messages flooded by the network edge nodes 3 and 4, and then the B-MAC2 and the calculated B-VIDs 10 and 11 are respectively taken as input parameters, destination B-MAC and B-VID, of an established forwarding table, and then network topology information is acquired according to an LSDB, and a shortest path first algorithm and the ECT algorithm 1 are used to calculate egress ports respectively going towards the network edge nodes 3 and 4.

Step S3: the network edge nodes 1 and 2 containing the inter-node LAG (LAG1) port calculate to acquire, by adding the Portal System Number of the present node corresponding to the LAG1 to the Base VID 10 and then subtracting 1, the B-VID 10 and the B-VID 11 respectively used for PBB encapsulation and decapsulation of the LAG1 of the network edge nodes 1 and 2. A mapping relationship between the B-VID 10 acquired at the edge node 1 and one or more service instances follows a mapping relationship between the Base VID 10 and the one or more service instances configured at the edge node 1; and a mapping relationship between the B-VID 11 acquired at the edge node 2 and the one or more service instances follows a mapping relationship between the Base VID 10 and the one or more service instances configured at the edge node 2. Similarly, the network edge nodes 3 and 4 containing the inter-node LAG (LAG2) port calculate to acquire, by adding the Portal System Number of the present node corresponding to the LAG2 to the Base VID 10 and then subtracting 1, the B-VID 10 and the B-VID 11 respectively used for PBB encapsulation and decapsulation of the LAG2 of the network edge nodes 3 and 4. A mapping relationship between the B-VID 10 acquired at the edge node 3 and the one or more service instances follows a mapping relationship between the Base VID 10 and the one or more service instances configured at the edge node 3; and a mapping relationship between the B-VID 11 acquired at the edge node 4 and the one or more service instances follows a mapping relationship between the Base VID 10 and the one or more service instances configured at the edge node 4.

Since different B-VIDs are used to perform the PBB encapsulation and decapsulation, in the SPBM network, it is forwarding isolated both between the network edge node 1 and the network edge node 4 and between the network edge node 2 and the network edge node 3; however, since there is an IPL aiming for the inter-node LAG both between the network edge node 1 and the network edge node 2 and between the network edge node 3 and the network edge node 4, after the PBB decapsulation is performed at the edge node 3 on a service flow sent from the network edge node 1 to the network edge node 3, the port added into the LAG2 on the edge node 3 may be used to directly send the service flow to the customer device 2, and the IPL between the edge node 3 and the edge node 4 may also be used to send the service flow to the edge node 4, and then the port added into the LAG2 on the edge node 4 is used to send the service flow to the customer device 2. As regards whether to send the service flow to the customer device 2 via the port added into the LAG2 on the edge node 3 or to send the service flow to the customer device 2 via the port added into the LAG2 on the edge node 4, it is determined by a flow allocation algorithm selected by the LAG2, which does not influence the implementation of the disclosure.

Example Embodiment 2

In the present example embodiment, a local-end customer device 1 uses the inter-node link aggregation technology to access an SPBM network in a dual-homing manner via a network edge node 1 and a network edge node 2. A far-end customer device 2 accesses the SPBM network in a single-homing manner via a network edge node 3. It is assumed that all nodes in the network are configured with the same one pair of Base VID and ECT algorithm, wherein the value of the Base VID is 10 and the value of the ECT algorithm is 1.

Figure 12:
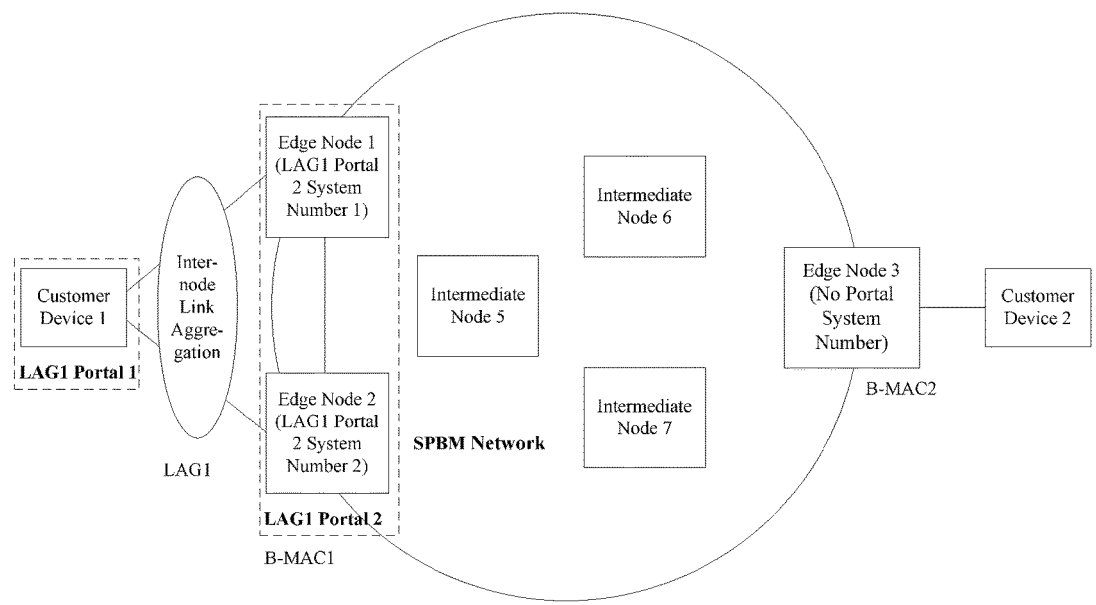
FIG. 12 is a schematic diagram of a network scene of local-end dual-homing and far-end single-homing of the example embodiment 2 according to an embodiment of the disclosure.

As shown in FIG. 12, it is a schematic diagram of a network scene of local-end dual-homing and far-end single-homing of the present example embodiment 2, and the notifying and processing procedure of each network node of the present example embodiment mainly includes the following steps:

Step S1: network edge nodes 1 and 2 containing an inter-node LAG (LAG1) port respectively notify outwards a B-MAC1 corresponding to the LAG1, and meanwhile, respectively notify a flag bit for indicating that the B-MAC1 is applied to the inter-node LAG. In an example embodiment, the flag bit may be set as 1 to identify that the B-MAC1 is applied to the inter-node LAG A network edge node 3 not containing an inter-node LAG port notifies outwards a B-MAC2. The network edge nodes 1 and 2 containing the inter-node LAG (LAG1) port respectively notify outwards a Base VID 10 and a corresponding ECT algorithm 1, and meanwhile, respectively notify Portal System Numbers 1 (in an example embodiment, it is presented by using a binary number 01) and 2 (a binary number 10) of the present node corresponding to the LAG1. The network edge node 3 not containing the inter-node LAG port notifies outwards a Base VID 10 and a corresponding ECT algorithm 1.

Network intermediate nodes 5, 6 and 7 may also respectively flood an LSP message outwards and notify a Base VID 10 and a corresponding ECT algorithm 1. Since there is no need to configure a B-MAC on the network intermediate nodes, none of the LSP messages flooded outwards includes the B-MAC.

Step S2: all the other nodes in the network apart from the edge nodes 1 and 2 may receive the B-MAC1s notified by the two edge nodes respectively, and the flag bit is used to judge that the B-MAC1 is applied to the inter-node LAG. All the other nodes in the network apart from the edge node 3 may receive the B-MAC2 notified by this edge node. The network nodes 3, 5, 6 and 7 receive the Base VID 10 and the Portal System Numbers 1 and 2 which are notified by the network edge nodes 1 and 2 respectively, a B-VID 10 and a B-VID 11 respectively corresponding to the network edge nodes 1 and 2 are obtained via calculation by adding the Portal System Number to the Base VID and then subtracting 1, and the obtained B-VID 10 and B-VID 11 both use the ECT algorithm 1 selected by the Base VID 10. The network nodes 1, 2, 5, 6 and 7 receive the Base VID 10 notified by the network edge node 3, directly take the Base VID 10 as the B-VID and use the ECT algorithm 1 selected by the Base VID 10.

The network nodes 3, 5, 6 and 7 extract the B-MAC1, the Base VID 10 and the Portal System Numbers 1 (the binary number 01) and 2 (the binary number 10) respectively from the received LSP messages flooded by the network edge nodes 1 and 2, and then the B-MAC1 and the calculated B-VIDs 10 and 11 are respectively taken as input parameters, destination B-MAC and B-VID, of an established forwarding table, and then network topology information is acquired according to an LSDB, and a shortest path first algorithm and the ECT algorithm 1 are used to calculate egress ports respectively going towards the network edge nodes 1 and 2. The network nodes 1, 2, 5, 6 and 7 respectively extract the B-MAC2 and the Base VID 10 from the received LSP message flooded by the network edge node 3, and the B-MAC2 and the Base VID 10 are respectively taken as input parameters, destination B-MAC and B-VID, of an established forwarding table, and then network topology information is acquired according to an LSDB, and a shortest path first algorithm and the ECT algorithm 1 are used to calculate an egress port going towards the network edge node 3.

Step S3: the network edge nodes 1 and 2 containing the inter-node LAG (LAG1) port calculate to acquire, by adding the Portal System Number of the present node corresponding to the LAG1 to the Base VID 10 and then subtracting 1, the B-VID 10 and the B-VID 11 respectively used for PBB encapsulation and decapsulation of the LAG1 of the network edge nodes 1 and 2. A mapping relationship between the B-VID 10 acquired at the edge node 1 and one or more service instances follows a mapping relationship between the Base VID 10 and the one or more service instances configured at the edge node 1; and a mapping relationship between the B-VID 11 acquired at the edge node 2 and the one or more service instances follows a mapping relationship between the Base VID 10 and the one or more service instances configured at the edge node 2. The network edge node 3 not containing the inter-node LAG port directly takes the Base VID 10 as the B-VID for the PBB encapsulation and decapsulation, and a mapping relationship between the Base VID 10 and the one or more service instances configured at the edge node 3 is the mapping relationship between the B-VID and the one or more service instances.

Since different B-VIDs are used to perform the PBB encapsulation and decapsulation, in the SPBM network, it is forwarding isolated between the network edge node 2 and the network edge node 3; however, since there is an IPL aiming for the inter-node LAG (LAG1) between the network edge node 1 and the network edge node 2, after the PBB decapsulation is performed at the edge node 1 on a service flow sent from the network edge node 3 to the network edge node 1, the port added into the LAG1 on the edge node 1 may be used to directly send the service flow to the customer device 1, and the IPL between the edge node 1 and the edge node 2 may also be used to send the service flow to the edge node 2, and then the port added into the LAG1 on the edge node 2 is used to send the service flow to the customer device 1. As regards whether to send the service flow to the customer device 1 via the port added into the LAG1 on the edge node 1 or to send the service flow to the customer device 1 via the port added into the LAG1 on the edge node 2, it is determined by a flow allocation algorithm selected by the LAG1, which does not influence the implementation of the disclosure.

In another embodiment, a kind of software is further provided, and the software is used to execute the technical solutions described in the above-mentioned embodiments and example implementations.

In another embodiment, a storage medium is further provided, and the storage medium has stored the above-mentioned software, and the storage medium includes but is not limited to optical disk, floppy disk, hard disk, erasable storage, and the like.

Obviously, those skilled in the art shall understand that the above-mentioned components or steps of the disclosure can be realized by using general purpose calculating device, can be integrated in one calculating device or distributed on a network which consists of a plurality of calculating devices. Alternatively, the components or the steps of the disclosure can be realized by using the executable program code of the calculating device. Consequently, they can be stored in the storing device and executed by the calculating device, and under some circumstances, the shown or described steps can be executed in different orders, or they are made into integrated circuit component respectively, or a plurality of components or steps thereof are made into one integrated circuit component. In this way, the disclosure is not restricted to any particular hardware and software combination.

The descriptions above are only the example embodiment of the disclosure, which are not used to restrict the disclosure. For those skilled in the art, the disclosure may have various changes and variations. Any amendments, equivalent substitutions, improvements, etc. within the principle of the disclosure are all included in the scope of the protection of the disclosure.

What is claimed is:
1. A method for accessing a shortest path bridging network in a multi-homing manner, comprising:
 receiving a Link State Protocol Data Unit (LSP) message flooded by an edge node containing an inter-node Link Aggregation Group (LAG) port in a network, wherein the LSP message carries a Backbone Media Access

Control Address (B-MAC), a Base Virtual Local Area Network Identifier (Base VID), and a Portal System Number of the edge node;

generating, according to the Base VID and the Portal System Number, a Backbone Virtual Local Area Network Identifier (B-VID) corresponding to the edge node; and establishing a forwarding table according to the B-MAC and the B-VID.

2. The method according to claim 1, wherein generating, according to the Base VID and the Portal System Number, the B-VID corresponding to the edge node comprises:

under the condition where received LSP messages flooded by multiple edge nodes carry the same B-MAC, determining whether each of the LSP messages carries an inter-node LAG flag bit, wherein the inter-node LAG flag bit is used to indicate that an edge node flooding the LSP message contains an inter-node LAG port corresponding to the B-MAC; and if each of the LSP messages carries the inter-node LAG flag bit, generating, according to the Base VID and the Portal System Number, the B-VID corresponding to the edge node.

3. The method according to claim 2, wherein under the condition where the LSP message is an ISIS-SPB LSP message, two bits in a reserved field of a sub-TLV of the ISIS-SPB LSP message carry the Portal System Number, and one bit in the reserved field of the sub-TLV of the ISIS-SPB LSP message carries the inter-node LAG flag bit.

4. The method according to claim 1, wherein different edge nodes located in the same inter-node LAG correspond to different Portal System Numbers.

5. The method according to claim 4, wherein a value of the Portal System Number comprises one of the following: 1, 2, or 3.

6. The method according to claim 5, wherein generating, according to the Base VID and the Portal System Number, a B-VID corresponding to the edge node comprises:

obtaining a B-VID corresponding to the edge node by adding the Portal System Number to the Base VID and then subtracting 1.

7. The method according to claim 1, wherein establishing the forwarding table according to the B-MAC and the B-VID comprises:

determining a shortest path tie-break Equal Cost Tree (ECT) algorithm corresponding to the Base VID used for calculating the B-VID, wherein corresponding relationships between the Base VIDs and the shortest path tie-break ECT algorithms configured by all nodes in the network are the same; and establishing the forwarding table according to the B-MAC, the B-VID, and the determined shortest path tie-break ECT algorithm.

8. The method according to claim 1, wherein the method further comprises:

the edge node containing the inter-node LAG port in the network acquiring a B-MAC, a Base VID, and a Portal System Number of the edge node;

generating, according to the Base VID and the Portal System Number, a B-VID corresponding to the edge node; and establishing, according to the B-MAC and the B-VID, a mapping table for Provider Backbone Bridge (PBB) encapsulation and decapsulation.

9. The method according to claim 8, wherein different edge nodes located in the same inter-node LAG correspond to different Portal System Numbers.

10. The method according to claim 9, wherein a value of the Portal System Number comprises one of the following: 1, 2, or 3.

11. The method according to claim 10, wherein generating, according to the Base VID and the Portal System Number, a B-VID corresponding to the edge node comprises:

obtaining a B-VID corresponding to the edge node by adding the Portal System Number to the Base VID and then subtracting 1.

12. The method according to claim 8, wherein establishing the mapping table for the PBB encapsulation and decapsulation according to the B-MAC and the B-VID comprises:

according to a mapping relationship between the Base VID used for generating the B-VID and one or more service instances, establishing a mapping relationship between the B-VID and the one or more service instances.

13. An apparatus for accessing a shortest path bridging network in a multi-homing manner, comprising:

a receiving unit, which is coupled to a generation unit, configured to receive a Link State Protocol Data Unit (LSP) message flooded by an edge node containing an inter-node Link Aggregation Group (LAG) port in the network, wherein the LSP message carries a Backbone Media Access Control Address (B-MAC), a Base Virtual Local Area Network Identifier (Base VID), and a Portal System Number of the edge node;

the generation unit, which is coupled to an establishment unit, configured to generate, according to the Base VID and the Portal System Number, a Backbone Virtual Local Area Network Identifier (B-VID) corresponding to the edge node; and the establishment unit, which is coupled to the generation unit, configured to establish a forwarding table according to the B-MAC and the B-VID.

14. The apparatus according to claim 13, wherein the generation unit comprises:

a first determination component, which is coupled to a generation component, configured to, under the condition where received multiple LSP messages flooded by multiple edge nodes carry the same B-MAC, determine whether each of the LSP messages carries an inter-node LAG flag bit, wherein the inter-node LAG flag bit is used to indicate that an edge node flooding the LSP messages contains an inter-node LAG port corresponding to the B-MAC; and the generation component, which is coupled to the first determination component, configured to, under the condition of determining that each of the LSP messages carries the inter-node LAG flag bit, generate, according to the Base VID and the Portal System Number, the B-VID corresponding to the edge node.

15. The apparatus according to claim 13, wherein the generation unit is further configured to obtain a B-VID corresponding to the edge node by adding the Portal System Number to the Base VID and then subtracting 1.

16. The apparatus according to claim 13, wherein the establishment unit comprises:

a second determination component, which is coupled to the generation unit, configured to determine a shortest path tie-break Equal Cost Tree (ECT) algorithm corresponding to the Base VID used for calculating the B-VID, wherein the corresponding relationships between the Base VIDs and the shortest path tie-break ECT algorithms configured by all nodes in the network are the same; and an establishment component, which is coupled to the second determination component, configured to establish the forwarding table according to the B-MAC, the B-VID, and the determined shortest path tie-break ECT algorithm.

17. An apparatus for accessing a shortest path bridging network in a multi-homing manner, located in an edge node containing an inter-node Link Aggregation Group (LAG) port, comprising:

an acquisition unit, which is coupled to a generation unit, configured to acquire a Backbone Media Access Control Address (B-MAC), a Base Virtual Local Area Network Identifier (Base VID), and a Portal System Number of the edge node;

the generation unit, which is coupled to an establishment unit, configured to generate, according to the Base VID and the Portal System Number, a Backbone Virtual Local Area Network Identifier (B-VID) corresponding to the edge node; and the establishment unit, which is coupled to the generation unit, configured to establish, according to the B-MAC and the B-VID, a mapping table for Provider Backbone Bridge (PBB) encapsulation and decapsulation.

18. The apparatus according to claim 17, wherein the generation unit is further configured to obtain a B-VID corresponds to the edge node by adding the Portal System Number to the Base VID and then subtracting 1.

19. The apparatus according to claim 17, wherein the establishment unit is further configured to, according to a mapping relationship between the Base VID used for generating the B-VID and one or more service instances, establish a mapping relationship between the B-VID and the one or more service instances.

* * * * *